Jan. 2, 1940.  N. P. HARSHBERGER  2,185,195
ART OF CURING AND PACKAGING BUILDING MATERIAL
Original Filed Nov. 22, 1932  2 Sheets-Sheet 1
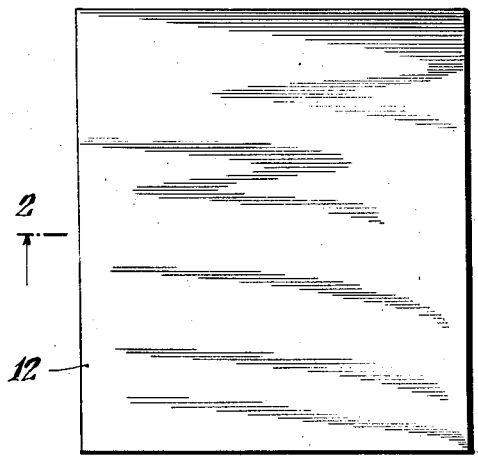
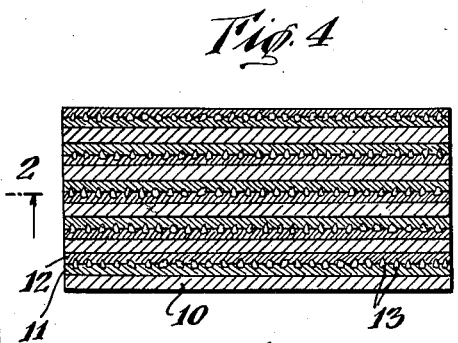
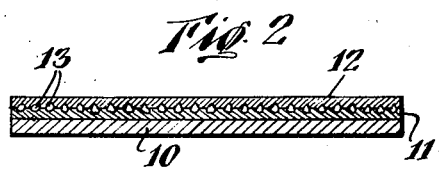
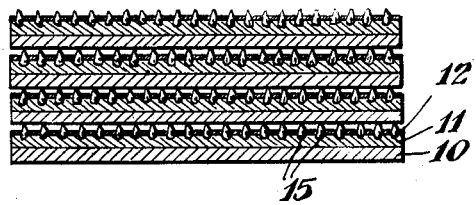
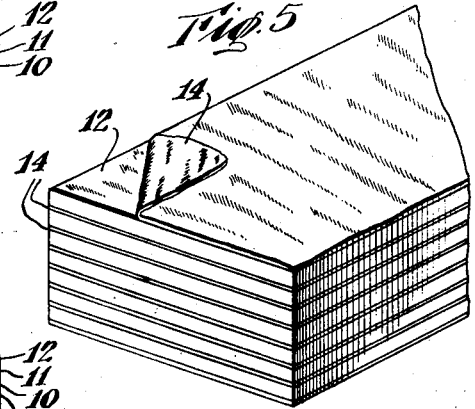
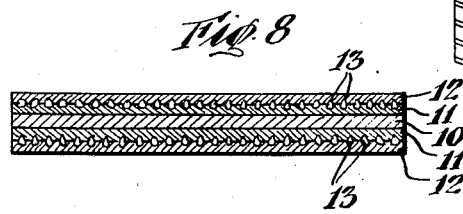
INVENTOR
Norman P. Harshberger
BY
Fred. W. Dodson.
ATTORNEY

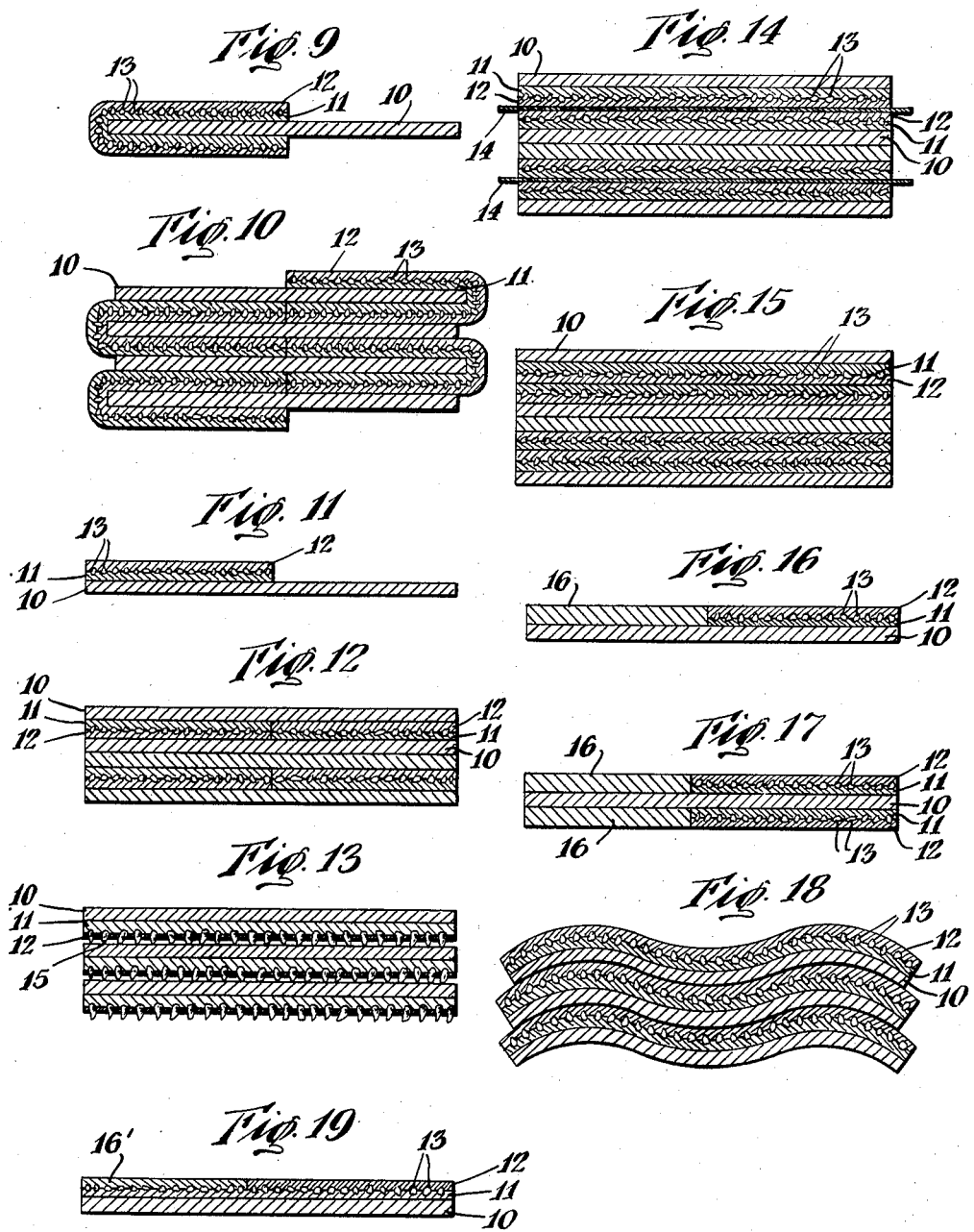

Patented Jan. 2, 1940

2,185,195

UNITED STATES PATENT OFFICE 2,185,195

ART OF CURING AND PACKAGING BUILDING MATERIAL

Norman P. Harshberger, Scarsdale, N. Y., assignor to Bakelite Building Products Co., Inc., New York, N. Y., a corporation of Delaware Original application November 22, 1932, Serial No. 643,891. Divided and this application January 17, 1936, Serial No. 59,503

6 Claims. (Cl. 25—154)

This invention relates in general to improvements in the art of stacking, packaging and curing building materials and is a division of my copending application Ser. No. 643,891, filed Nov. 22, 1932.

More particularly, this invention has reference to the stacking, packaging, and curing of shingles consisting of a treated fibrous base coated with a layer of any viscous materials, contemplating bituminous or resinous types, and a layer of hydraulic cement wherein the hydraulic cement is caused to adhere to the coated base preferably by a suitable bonding medium.

Rigid shingles, containing cement as a principal ingredient, must be permitted to cure for a period of approximately six weeks and heretofore, during this slow curing process the moisture has been lost before the cement has fully set, thus permitting lime action to take place and causing the formation of an objectionable surface layer of dust. In rigid shingles of the type heretofore made, in order to retain sufficient moisture to produce proper curing, an excessively thick section would have to be employed. Aside from the above-mentioned difficulties the curing of cementitious shingles which are not mounted on a fibrous base presents many other difficulties.

With the type of rigid shingle contemplated by the present invention, however, wherein there is merely a surface layer of cement to be suitably bonded to a saturated fibrous base proper curing also presents difficulties. This is because of the fact that the coefficient of expansion of the cement and of the fabric base is different, and therefore during the curing process and during the setting of the cement, curling is likely to take place if ordinary curing methods are employed for the curing of fibrous based shingles.

It is one of the objects of the present invention to provide a method particularly adapted for the making and curing of cementitious shingles having a fibrous base as a part thereof, in which the fibrous base supports the cementitious layer in handling and in which the curing is so accomplished as to prevent the possibility of the individual shingles curling and to prevent efflorescence and consequent disfiguration and discoloration of the surfaces.

A further object of the invention is to provide a method of curing shingles wherein the moisture which is inherent in the hydraulic cement is retained for a relatively long period to prevent the formation of an objectionable surface layer of dust and to prevent lime action.

A still further object of the invention is to provide a method of curing shingles which includes the prompt stacking of the cut units and the curing of the shingles in stacked relation, i. e., with the sides of the units facing each other, thus enabling the manufacturer to compactly store the shingles during the curing process.

A more specific object of the invention is to provide a method as above described wherein novel separating means are employed between the individual shingles in the stack to prevent adherence of the shingles to one another and wherein said means may include independent separating media and/or separating ingredients in the cement mixture and/or separating ingredients in the material forming the base of the shingles and/or a separating layer adhering to the base of the shingles and/or the formation of the shingle surface or surfaces in such a manner as to prevent adhesion with adjacent shingles.

With the above and other objects in view, the invention consists of the improved art of making and curing shingles and all its parts and combinations as set forth in the claims, and all equivalents thereof.

In the accompanying drawings in which the same reference numerals designate the same parts in all of the views:

Fig. 1 is a plan view of an individual shingle;

Fig. 2 is an exaggerated sectional view taken on line 2—2 of Fig. 1;

Fig. 3 is a similar section showing a modified form of construction;

Fig. 4 is a cross-sectional view of a stack of shingles illustrating the method of stacking shingles of the type illustrated in Figs. 2 and 3;

Fig. 5 is a perspective view of a stack of shingles showing a modified method of separation;

Fig. 6 is a sectional view similar to Figs. 2 and 3, illustrating a modified form of shingle;

Fig. 7 is a cross-sectional view showing the method of stacking shingles of the type illustrated in Fig. 6;

Fig. 8 is a sectional view similar to Fig. 2 showing still another form of shingle which may be utilized in connection with the improved curing method;

Fig. 9 is a cross-section of a partially double surfaced shingle;

Fig. 10 is a cross-section showing the method of stacking the shingles of Fig. 9;

Fig. 11 is a cross-sectional view illustrating a shingle which is only partially surfaced on one side;

Fig. 12 is a cross-sectional view showing the method of stacking the shingles of Fig. 11;

Fig. 13 is a cross-sectional view showing a modified method of stacking the shingle of Fig. 6;

Fig. 14 is a cross-sectional view illustrating a modified method of stacking the shingles of Fig. 2;

Fig. 15 is a similar view showing still another method of stacking the shingles of Fig. 2;

Figs. 16, 17 and 19 are cross-sectional views showing other types of shingles which may be cured by the improved method; and Fig. 18 is a cross-sectional view showing the method of stacking curved elements.

Referring more particularly to the drawings, the shingle illustrated in Figs. 1 and 2 consists of a fibrous base 10 which may be paper, felt or the like which has been saturated with a suitable viscous material such as asphalt, and coated with a similar material as at 11. A surface layer 12 of hydraulic cement is formed over the layer 11 and this cement may be an ordinary Portland cement but is preferably a high early strength (accelerated hardening) Portland, for instance, commercial "Incor", or a quick setting Portland, but better still, preference is given to a high alumina cement, for instance, commercial Lumnite, and which also may be quick setting, to obtain certain beneficial characteristics in the carrying out of the invention. In order to obtain a suitable bond between the asphaltic coating 11 and the cement layer 12, some type of bonding medium is preferably employed and in Fig. 2 the bonding medium consists of mineral particles 13, such as for example, slate, embedded in and projecting above the asphalt coating 11. These particles are gripped by the cement 12 when it sets. As illustrated in a modification, Fig. 3, this bonding medium may be a fibrous material such as mineral wool, vegetable fibers or animal hair as at 13'.

In the manufacture of the product it is preferred to form the asphalt coated base as a web, and to add mineral particles or other bonding medium to the surface of said web. The web is then preferably cut to form individual shingle units, and these units are then coated with a layer of hydraulic cement. It is, however, possible to coat the entire web with cement prior to the cutting. With either method, however, the individual shingles are formed before the cement has set, and the shingle is then completed except for the curing process which forms the subject matter of the present invention.

Ordinarily, the curing process is relatively slow, and the moisture which is inherent in the hydraulic cement evaporates before the cement has had an opportunity to properly hydrate and set, thus causing the formation of an objectionable dust on the surface of the article, and with certain hydraulic cements permitting lime action to take place. One of the important features of the present invention relates to the prevention of the rapid loss of moisture from the cement.

The above is accomplished by immediately stacking, i. e. arranging with their sides facing each other, the cut and cement coated shingles one on another in the manner indicated in Figs. 4 and 15 and permitting the shingles to cure while in stacked formation. With this arrangement the cement surface is not exposed to the air, except such as may enter between the individual shingles and the moisture is therefore retained for a relatively long period and until after the setting of the cement has taken place.

It has been found that when the individual shingles are separated, after the curing has been sufficiently completed, that various surface formations ranging from smooth effects to irregular or mottled effects, in which no two elements have exactly similar formations, may be obtained. The degree of the effects so produced can be controlled by proper surface preparation and by regulation of the stacking and curing operations.

In order to obtain the above advantages of stacking, however, it is necessary to cope with the problem of preventing the shingles from becoming bonded to one another in the stack. The present method therefore includes as an important feature, the use of a suitable separating means to prevent the cement coating of one shingle from becoming bonded to the shingle above. One form of separating medium is provided by mixing with the hydraulic cement, before its application to the shingles, ingredients which come to the surface of the cement and form a separating film thereon. For this purpose it is preferred to mix with the cement, fractions of one to ten percent of such ingredients, and these ingredients may be material such as synthetic resin, asphalt, wax, or oil such as linseed or tung oil. These materials will, as before mentioned, appear on the surface of the cement when it sets, and will form the desired separating film.

In addition to the separating means above defined or as a substitute therefor, the back of each shingle may be coated with a suitable separating layer or have combined with its composition a suitable separating substance. The material comprising this layer or separating substance may be any that will not combine with the cement and which will prevent union with the cement of the next contacting shingle. For this purpose suitable waxes or oils may be employed.

Another important form of separating means which is contemplated by the present invention is the use of a flexible vehicle such as paper or cloth treated with a suitable separating medium such as wax or oil. This type of flexible separating medium is used between each of the shingles in the stack and is designated by the numeral 14 in Figs. 5 and 14. With the flexible type of separator 14, a certain amount of moisture from the hydraulic cement will be absorbed by the separator, and the latter will shrink and form wrinkles. Due to the weight of the stack on the separator, these wrinkles will be pressed into the cement, and as the latter sets, the surface will be formed with wrinkles therein simulating the grain of wood. After the curing process has taken place, the separating pieces 14 may be readily removed because of the non-adherence of the cement to the separator itself.

An additional method of preventing adherence of the individual shingles to one another while stacked for curing is illustrated in Figs. 6 and 7. When this method is employed the crushed mineral or pebbles such as that used at 13 in Fig. 2, is of a coarser nature so that it projects above the cement layer 12, as at 15. When shingles of this type are stacked for curing, the projecting mineral particles 15 will tend to slightly elevate the shingle above to prevent contact with the setting cement, as indicated in Figs. 7 and 13.

In Fig. 8 a shingle is illustrated which is identical to that illustrated in Fig. 2 except that the asphalt coating 11, mineral 13, and cement coating 12 is applied on both sides of the fabric base 10 to provide a reversible shingle. Fig. 9 illustrates a partially coated shingle wherein only the portion to be exposed to the weather has been surfaced. The method of stacking these shingles is shown in Fig. 10, and a suitable separating medium as before described may be employed.

The type of shingle illustrated in Fig. 11 is surfaced in the manner described in connection with Fig. 2 except that the surfacing is only on the portion of the shingle which is to be exposed in assembly. This type of shingle may be stacked in the manner indicated in Fig. 12, a suitable separating means being employed.

As it is sometimes more practical in packaging to have the top and bottom sides of an article lying in flat planes it may be arranged in the manufacturing process to take a shingle as shown in Fig. 11 and apply to that portion comprising the unsurfaced part, a layer of bituminous material 16 as shown in Fig. 16.

Fig. 17 shows an element surfaced and coated on both sides to obtain the same result as in Fig. 16.

While nearly all of the figures illustrated show elements of a flat type, this in no way should be construed to mean that shaped elements are not contemplated by this invention. One of the shaped elements of this type is illustrated in stack formation in Fig. 18.

The shingle illustrated in Fig. 19 is also designed to obtain the result of Fig. 16, but in this form the coating of asphalt 11 and the grit 13 cover the entire surface. The cement layer 12 is used only on the portion to be exposed and the remainder of the shingle is leveled with a layer of bituminous material 16'.

As an additional step in any of the above methods the cut and stacked elements may be subjected to pressure for the purpose of extruding such surplus hydraulic cement as may be desired and suitable means may be then employed for removing the surplus cement from the edges of the stack. This may be done by any ordinary scraping step. The scraping step may be also applied to the surface of individual elements to remove surplus material, if so desired. Also where it is desired to have the coating project beyond or over the edges of the stacked shingles and yet prevent adhesion of the adjacent shingles in the stack, the surplus cement may be received by separators having portions projecting beyond the shingle edges. This type of separator is indicated at 14 in Fig. 14 and may be employed in any of the stack arrangements disclosed.

Where pebbles or the like are used as separating means, as in Fig. 7, the edges of the elements may be protected by any suitable means to prevent the evaporation of moisture.

A further very material use of this novel curing method is in overcoming loss of color where the cement is mixed with coloring pigments, and the combination of cement and coloring pigments is therefore contemplated by this invention.

An additional advantage gained from the use of the viscous materials described heretofore in combination with the cement is that of preventing lime action from taking place, thus preventing efflorescence and any other disfiguration or discoloration to the surface by precluding the evaporation of moisture.

From the above it may be seen that a very desirable method of making and curing shingles has been described wherein a fibrous based cement shingle is cured in stacked formation to prevent curling of the shingles and to prevent loss of moisture and wherein means are utilized as a step in the method of preventing the shingles from becoming bonded to one another during the curing process.

I claim:

1. The method comprising applying a surface layer of plastic cement upon a resilient base material capable of supporting said layer, forming a compact grouping consisting of units of said cement surfaced base material and with the sides of the units facing each other, forming said group while the cement is still plastic, covering each cement surfacing of the grouped units with a fibrous separator which will not bond to the cement and of greater dimension than said units to substantially prevent bonding between adjacent units, arranging said separators as to project beyond the edges of said units, edge coating the units as thus arranged with plastic cement and permitting the cement to harden.

2. The method comprising applying a surface layer of plastic weather resistant material upon a fibrous base of sufficient shape retaining property to support by itself said plastic layer, forming a compact grouping consisting of units of said surfaced base material and with the sides of the units facing each other, forming said group while the surfacing layer is still plastic, covering each plastic surfacing of the group units with a separator which will not bond to the surfacing layer and of greater dimension than said units to substantially prevent bonding between adjacent units and placing said separators as to project beyond the edges of said units, edge coating the base of said units by applying pressure to the surfacing units so arranged, and to cause flow of the plastic surfacing material over the edges thereof, and curing the units as thus arranged.

3. The method of making and curing cementitious shingles comprising securing a surface layer of plastic hydraulic cement to fibrous base material of sufficient rigidity to support by itself said cement layer, forming a compact grouping consisting of a plurality of units of said cement surfaced base material and flexible membranes that will not bond to hydraulic cement, forming said group while the cement is still plastic and forming said group with the sides of the units facing each other and with said flexible membranes covering each cement surfacing of the group to substantially prevent bond of the hydraulic cement layer of one unit with a side of an adjoining unit in curing, and curing the units as thus arranged, said units being adapted for packaging without regrouping the individual layers.

4. The method of making and curing cementitious shingles, comprising forming sheet fibrous base material of sufficient rigidity to support by itself a plastic hydraulic cement layer, dividing and surfacing said material with a layer of hydraulic cement to form cement surfaced units, forming a compact grouping consisting of a plurality of said units and flexible membranes that will not bond to hydraulic cement, forming said group while the cement is still plastic and forming said group with the sides of the units facing each other and with said flexible membranes covering the plastic cement layers to substantially prevent bonding of the hydraulic cement layer of one unit with a side of an adjacent unit in curing, and curing the units as thus arranged, said units being adapted for packaging without regrouping the individual layers.

5. The method of making and curing cementitious shingles comprising applying a surface layer of plastic hydraulic cement upon fibrous base material of sufficient rigidity to support by itself said cement surfacing, said cement surfacing extending over certain edges of said base material; forming a compact grouping consisting of a plurality of units of said cement surfaced base material, and flexible membranes that will not bond to hydraulic cement and of greater dimensions than said units, forming said group while the cement is still plastic and forming said group with the sides of the units facing each other and with said flexible membranes projecting beyond the edges of the units and covering the cementitious surfacings of the units to substantially prevent bonding of the hydraulic cement side or edge surfacing of one unit with the side or edges of an adjoining unit in curing, and curing the units as thus arranged, said units being adapted for packaging without regrouping the individual layers.

6. The method of making and creating effects on cementitious shingles, comprising securing a surface layer of plastic hydraulic cement to one side of fibrous base material of sufficient rigidity to support by itself said cement layer, the opposite side of said base material being substantially in dry condition; forming a compact grouping consisting of a plurality of units of said cement surfaced base material and liquid absorptive, porous, flexible membranes that will substantially not bond to hydraulic cement, forming said group while the cement is still plastic and forming said group with the moist cement sides of the units facing the dry side of their respective adjacent units and with said flexible membranes covering the cement surfaced sides and in contact with the dry side of the adjacent units, and permitting the cement surfacing to harden while the units are so arranged; said membranes substantially preventing bonding of the adjacent units in curing and said membranes absorbing liquid from said moist cement sides whereby to wrinkle and form surface effects upon the cementitious sides and said units being adapted for packaging without regrouping the individual layers.

NORMAN P. HARSHBERGER.